United States Patent [19]

Remus

[11] 4,327,347

[45] Apr. 27, 1982

[54] SYNCHRO

[75] Inventor: Casimer F. Remus, Tunkhannock, Pa.

[73] Assignee: The Bendix Corporation, Teterboro, N.J.

[21] Appl. No.: 143,673

[22] Filed: Apr. 25, 1980

[51] Int. Cl.³ .............................................. H01F 21/06
[52] U.S. Cl. ...................................... 336/120; 310/71
[58] Field of Search ................. 310/68 R, 71, 176, 37, 310/66, 273, 36, 38; 336/120, 119, 135, 122, 123

[56] References Cited

U.S. PATENT DOCUMENTS

| | | | |
|---|---|---|---|
| 3,186,157 | 6/1965 | Favret et al. ..................... | 310/37 X |
| 3,295,083 | 12/1966 | Fiore ................................. | 310/71 X |
| 3,976,965 | 8/1976 | Remus ............................... | 336/120 |

*Primary Examiner*—J. V. Truhe
*Assistant Examiner*—Morris Ginsburg

*Attorney, Agent, or Firm*—Anthony F. Cuoco; Kenneth A. Seaman

[57] ABSTRACT

An improved synchro including a pair of flats helically-coiled hairsprings (320,330) mounted between a rotatable rotor (100) and relatively fixed stator (200), said hairsprings being electrically conductive for carrying an electrical excitation between a rotor-mounted connector (310) and an external source coupled to terminal blocks (350,360) and for providing a mechanical linkage allowing limited relative rotation between the stator and rotor. The hairsprings are contained within a dielectric or insulating housing assembly (340) which is mounted to or carried on the stator and each is coupled to one of a pair of spaced electrical contacts (312,314) on the rotor-mounted connector. As such, the system provides an electrical interconnection between the contacts (312,314) and the terminal blocks (350,360) for rotor energization, while maintaining a rotatable mechanical connection between the stator (200) and rotor (100).

8 Claims, 7 Drawing Figures

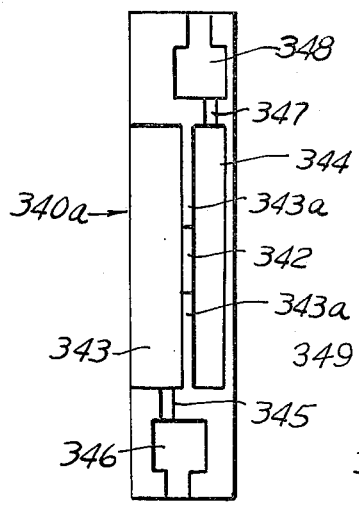
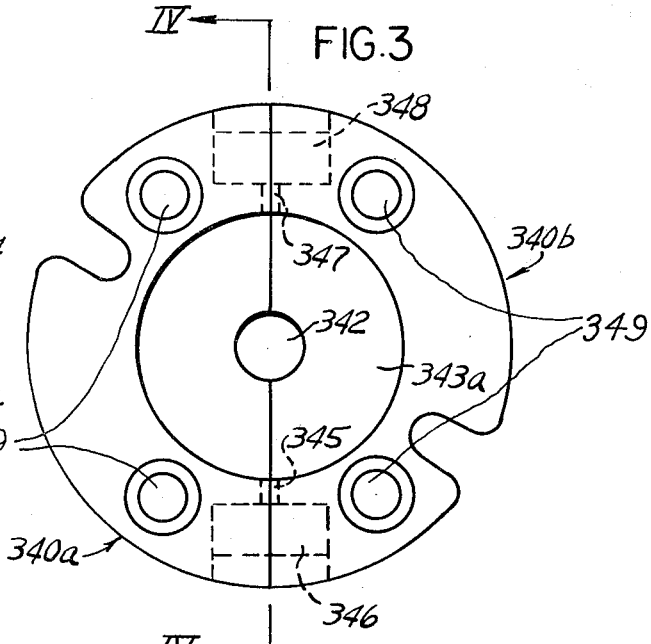
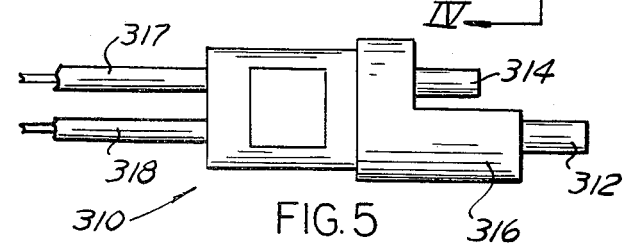
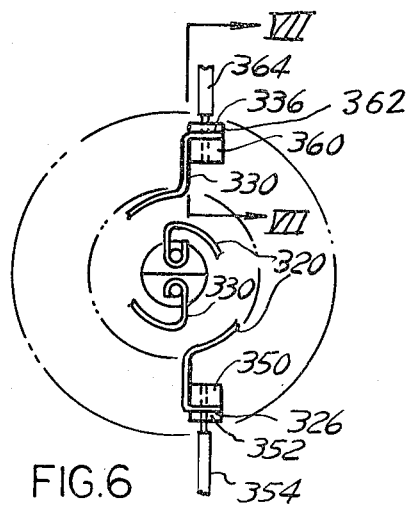
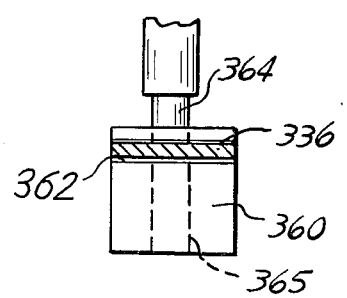

SYNCHRO

BACKGROUND OF THE INVENTION

The present invention relates to rotor and stator interconnections, as in synchros of the type used in pressure sensing applications. In one such application, an oil pressure transducer is mounted directly on an aircraft jet engine. In such systems, adverse temperatures and vibrations are encountered, yet an electrical connection between a movable element (a rotor) and a fixed source of electrical rotor excitation must be maintained, while allowing limited relative rotation between rotor and stator.

Several prior art systems have been proposed for such a synchro. A sliding contact, as between a movable brush and a fixed contact ring, is used in some applications to transmit an electrical rotor excitation while allowing rotation. Such a system is acceptable in some applications, but provides contact noise (in the form of a high frequency noise signal) in response to friction resulting from relative movement. Such noise signal is undesirable in some applications. Additionally, in such systems an accurate zero-load position is difficult to obtain. Further, such systems tend to wear and require maintenance to avoid failure. The brushes, as they wear, also produce undesirable debris which can prevent proper synchro operation.

Other systems have been proposed for such contacts. However, these contacts are either difficult to manufacture, costly to assemble, involve many parts and/or very delicate parts. Many parts or delicate parts present reliability and a cost problems which are avoided if possible.

Other prior art synchros include a pair of conductors which have the possibility in some applications to short together and effectively defeat the synchro by eliminating the rotor excitation signal carried by the conductors. As such, such systems are unreliable and inaccurate and therefore undesirable.

Some other systems are possible when environmental factors (vibration and temperature) are not present.

Some synchros have also been proposed using a uniform-diameter series of stacked wire coils.

Many of the prior art synchros suffer from an undesirable hysteresis effect in the relationship between the output electrical signal and the input, the rotary position of a shaft. A synchro, ideally, not only does not have hysteresis in such relationship, but also has a constant proportion between rotary position of the input (rotor shaft) and the output signal (on the stator).

Examples of such prior art are shown in U.S. Pat. Nos. 3,976,965 and 3,295,083 and the patents cited as prior art therein.

Accordingly, the prior art systems have significant limitations and disadvantages.

SUMMARY OF THE INVENTION

The present invention overcomes the limitations and disadvantages of the prior art synchros by providing a simple, yet reliable, improved mechanical mounting between a rotor and a stator which provides a noise-free rotor excitation. The improved mounting includes a pair of helically-wound, planar hairsprings, each mounted between a stator-mounted terminal and a connector contact coupled to the rotor. Each of said hairsprings being received in an axially spaced annular recess in a generally-cylindrical molded dielectric housing. The hairsprings are separated from each other and the environment by housing webs or walls.

The present invention overcomes the limitations of the prior art by providing a simple and reliable, yet inexpensive to manufacture, assembly for connecting the rotor and the stator. The assembly provides a relatively noise-free electrical signal as excitation for the rotor, while allowing limited rotation between rotor and stator. The present invention also has the advantage that contact noise and unreliability through friction and sliding contacts are eliminated and the accompanying high frequency (radio frequency) noise is thereby eliminated.

The present invention has the advantage that a brushless electrical interconnection with the rotor has been achieved.

The present invention reduces debris inside the housing resulting from brush wear.

The present invention also achieves a rotor mounting which reduces hysteresis in the rotation/signal relationship and provides a substantially uniform input rotation to output signal relationship over a usual range of operation.

The present invention also has the advantage that there are a minimum number of parts to stock in that the two spring members may be substantially identical and the housing assembly may be formed by two substantially identical halves.

The foregoing and other objects and advantages of the present invention will be apparent to one skilled in the art in view of the following detailed description of the drawings and the accompanying drawings.

BRIEF DESCRIPTION OF THE DRAWINGS

FIG. 3 is a view of a housing assembly of the type used in the present invention for receiving the hair spring members therein, taken along the line III—III of FIG. 1, looking in the direction of the arrows.

FIG. 4 is a cross sectional view of one housing member of the FIG. 3, taken along the line IV—IV in FIG. 3 looking in the direction of the arrows.

FIG. 5 is an enlarged view of an electrical connector of the type used to mount the hairspring members to the rotor.

FIG. 6 is a partial and cross-sectional view of hairspring connections to the electrical connector of FIG. 5 and housing-mounted terminals.

FIG. 7 is an enlarged view of one terminal, taken along the line VII—VII in FIG. 6, looking in the direction of the arrows.

DETAILED DESCRIPTION OF THE DRAWINGS

Figure 1:
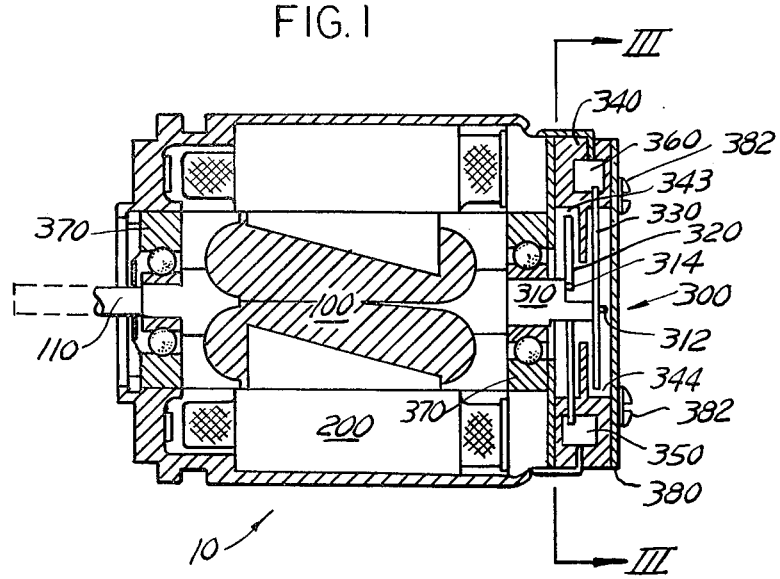
FIG. 1 is a cross sectional view of an improved synchro of the present invention, showing its stator, its rotor and the improved coupling embodying the present invention therebetween.

FIG. 1 is a cross sectional view of an apparatus (i.e., a synchro) 10 of the present invention. Included in the apparatus 10 are a rotor 100, a stator 200 and a interconnection system, shown generally by the reference numeral 300. The interconnection system 300 includes a rotor-mounted electrical connector 310, a pair of helically-wound hairsprings 320, 330 mounted in a housing assembly 340.

The rotor 100 is mechanically linked to an input shaft 110 to rotate therewith. The input shaft 110 may be from a pressure sensor (or other indicating device), with rotation of such shaft being indicative of a sensed value.

As shown in FIG. 1, the rotor 100 is mounted within the stator 200, with the electrical connector 310 mounted to the rotor 100. Hairsprings 320, 330 are mounted to two respective axially-spaced terminals 312, 314 on the connector 310. The hairsprings 320, 330 are received within annular recesses 343, 344 of the housing assembly 340, with the annular recesses 343, 344 being spaced axially along the length of the housing 340.

Two terminal blocks 350, 360 are mounted to the housing assembly 340 and are coupled to the hairsprings 320, 330, respectively, and to an electric power source providing rotor excitation.

A pair of bearing assemblies 370 mount the rotor 100 and its shaft 110 at either end thereof to the stator 200 (more accurately, a housing associated with the stator 200).

A plate 380 is mounted by screws 382 to the housing assembly 340 and stator 200.

The rotor 100 and stator 200 are chosen from among commercially available types and the rotor excitation is driven with an appropriate type signal, all of which are well known in the art. The stator has output terminals (not shown) for providing an output electrical signal indicative of shaft rotation.

Figure 2:
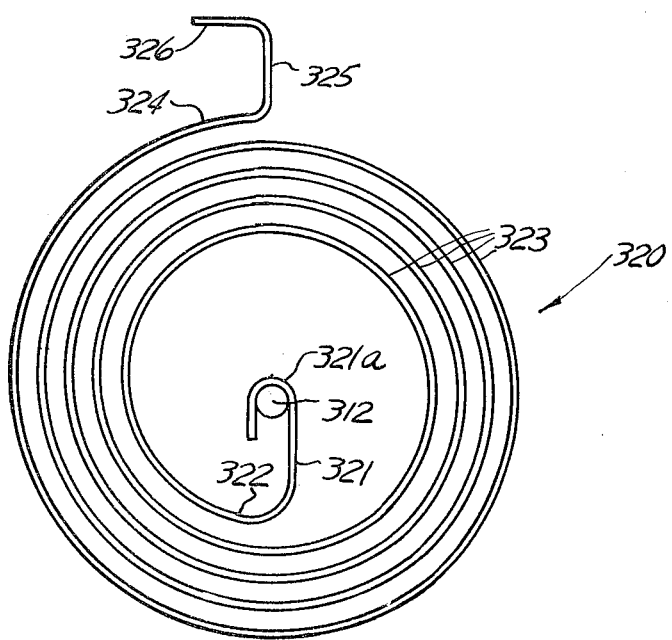
FIG. 2 is a side view of a hairspring member of the type used in the present invention.

FIG. 2 is an enlarged view of one hairspring 320. The hairspring 320 is generally flat or planar and includes a helically (or spirally) wound portion 323 of progressively greater radius from an internal smallest radius 322 to a largest radius portion 324. At the smallest radius 322 the hairspring is bent to be substantially radial, extending inwardly at a portion 321, terminating at an internal loop 321a. This loop 321a extends around and is soldered to one terminal 312 of the electrical connector 310. The outer or largest radius portion 324 also includes a radially extending portion 325 which extends radially outwardly and terminates a transverse portion 326. As explained later in connection with FIG. 6, the transverse portion 326 fits within a terminal block for connection to the rotor.

FIG. 3 shows a view of the housing assembly 340 into which the hairsprings (not shown) and electrical connector (not shown) are mounted. This housing assembly 340, preferably made out of a dielectric material for electrical insulation (from a material such as Ryton-brand plastic) includes two identical halves 340a, 340b, which when assembled have a central aperture 342 for receiving the electrical connector 310 therein when the apparatus is assembled. Communicating with and extending radially outward from the central aperture 342 is the annular recess 343 formed by a wall 343a, respectively. Coupled to the recesses 343 and 344 are radial passages 345, 346, 347, 348. Associated with and coupled to the annular recess 343 are radial passages 345 and 346, extending downwardly in the present view from the annular recess 343. Associated with and extending upwardly from the second annular recess 344 (located behind wall 343a from recess 343) are passages 347 and 348. Four screw holes 349 are shown to which screws (382 in FIG. 1) couple the plate (380 in FIG. 1) through the housing halves 340a, 340b into the stator.

FIG. 4 shows a cross sectional view of one housing half 340a. A central aperture 342 is shown (which receives the connector). The axially spaced radial recesses 343, 344 are shown, spaced by the wall 343a of dielectric (insulating) material. The apertures 345, 346, 347 and 348 are shown.

FIG. 5 shows an enlarged view of the connector 310 used in the present assembly. The connector includes two terminals 312, 314 mounted in an insulating body 316 and coupled to insulated leads 317, 318.

FIG. 6 is a mounting view of the hairsprings 320, 330 and the terminal blocks 350, 360. As is shown, the transverse end portions 326, 336 of the hair springs are coupled to respective terminal portions 352, 362 of the blocks 350, 360, which are also coupled to conductors 354, 364 for provinding rotor excitation.

FIG. 7 is a view of the terminal block 360 and the conductor 364 which extends into an internal passage 365 of the block 360 and is secured therein. The bent portion 336 of hairspring 330 is shown attached to the terminal portion 362 in the block 360.

The synchro is assembled as follows in one representative method of making. The connector is assembled to the rotor and the bearing plates are mounted at the ends of the rotor. The hairsprings are then coupled (by soldering preferably) to the terminals of the connector, with the hairspring adjacent the rotor coupled first. The two housing halves are then assembled over the hairsprings by moving them radially into position, then the plate 380 is mounted to the stator through apertures in the housing halves.

While a preferred embodiment of the present invention has been described with some specificity, it will be apparent to those skilled in the art that many modifications are possible without departing from the spirit of the present invention. Additionally, some features of the present invention may be used without the corresponding use of other features. For example, while the hairsprings are disclosed as preferably planar (flat) for a compact assembly, but might be helical or three-dimensional. Further, the housing assembly could be built of several ring-shaped members, rather than two semi-cylindrical members. The two hairsprings could be located at opposite ends of the assembly. Accordingly, the foregoing description should be considered merely as illustrative of the present invention, and not in limitation thereof, which is defined solely by the following claims.

Having thus described the invention, what is claimed is:

1. An apparatus coupling a fixed stator member to a movable rotor member in rotatable relationship while providing an electrically conducting path to the rotor member, comprising:
 a connector mounted to the rotor for receiving electric power, said connector including two spatially-separated electrical terminals;
 a housing assembly mounted to the fixed stator member, said housing assembly including a central aperture into which the connector extends and two axially-spaced annular recesses communicating with said central aperture, with a radial aperture extending from each annular recess outward to a peripheral edge of the housing assembly;
 two terminal blocks each having first and second terminals and each being mounted within a respective radial aperture of the housing assembly; and
 two helically-wound spring members received in respective annular recesses and made of electrically conducting material, each of said spring members being wound in progressively larger diameter spirals from an inner radius portion to an outer radius portion, said inner radius portion of each member being coupled to one of said spatially separated electrical terminals on said connector and said outer radius of each member being coupled to the first terminal on a respective terminal block whereby when electrical power is applied to the second terminal on each terminal block, it is transmitted between said second terminals on each terminal block and said movable rotor member via the terminal blocks, the spring members and connector, while the spring members mounting said movable rotor member to said fixed stator member in a rotatable relationship.

2. The combination of the type described in claim 1 wherein said combination comprises a synchro apparatus and the spring members allow a limited rotation of the rotor member.

3. The combination of the type described in claim 1 wherein said spring members are generally flat and planar.

4. The combination of the type described in claim 1 wherein the housing assembly includes two substantially identical halves which are assembled together.

5. The combination of the type described in claim 3 wherein said planar spring members are generally parallel and separated by a dielectric material.

6. The combination of the type described in claim 1 wherein said housing assembly is generally cylindrical and has an axis aligned with the axis of rotor rotation, and said connector terminals extend axially with one terminal being axially offset from the other terminal.

7. The combination of the type described in claim 4 wherein the halves of the houing assembly are generally semicylindrical 8. An electrical apparatus comprising a rotor and a stator, the rotor having a winding thereon, a shaft defining an axis supporting said rotor for rotation relative to said stator and having a pair of electrical terminals associated with the rotor and coupled to the winding, the improvement comprising:

a housing surrounding at least a portion of the shaft-mounted terminals, said housing including a pair of axially-spaced radially-extending recesses separated by a radial insulating portion, each recess associated with an electrical terminal mounted to the housing for receiving a rotor power signal;

means for coupling the shaft-mounted terminals to the rotor terminals while allowing relative rotation of said rotor, said means including a first and a second spirally-wound hairsprings, each made of electrically conductive material, each of said hairsprings being mounted in a respective recess of said housing and coupling one of said housing mounted terminals to one of said rotor terminals, whereby when the rotor power signal is applied to the housing-mounted terminals, the signal is conducted by said hairsprings to the rotor terminals while the hairsprings allow a rotational movement of said rotor with respect to said stator.

* * * * *